United States Patent Office 3,644,324
Patented Feb. 22, 1972

3,644,324
POLYMERS AND COPOLYMERS OF BUTADIENE, ETC., HAVING RELATIVELY WIDE MOLECULAR-WEIGHT DISTRIBUTION
Adel F. Halasa, Bath, Ohio, assignor to The Firestone Tire & Rubber Company, Akron, Ohio
No Drawing. Continuation-in-part of application Ser. No. 749,593, Aug. 2, 1968. This application Feb. 2, 1970, Ser. No. 8,069
Int. Cl. C08d 5/04
U.S. Cl. 260—94.7 R
2 Claims

ABSTRACT OF THE DISCLOSURE

Polymers which are homopolymers of hydrocarbon conjugated dienes of 4 to 6 carbon atoms or copolymers of such dienes or copolymers of such dienes with styrene or a derivative of styrene, which polymers possess objectionable cold flow, are joined by use of a lithium-based catalyst and titanium chloride to produce a polymer having no cold flow. The resulting polymers and copolymers have a broadened molecular weight distribution and excellent mill-processability.

---

This application is a continuation-in-part of my application Ser. No. 749,593, filed Aug. 2, 1968, now abandoned.

This invention relates to the treatment of a rubber polymer which has objectionable cold flow and obtaining therefrom a polymer which has wider molecular-weight distribution and therefore less cold flow.

The polymers which are treated may be (a) homopolymers of hydrocarbon conjugated dienes having 4 to 6 carbon atoms or (b) copolymers of such dienes or (c) copolymers of such a diene with styrene. These polymers may be produced in solution or emulsion, using any suitable catalyst. If the polymer is produced in solution, the cement obtained on termination of the polymerization is treated; if the polymer is not in solution it is brought into solution in an inert solvent and then treated with hydrocarbon lithium and titanium tetrachloride which act together as a joining reagent.

It is known in the art to use titanium tetrachloride in combination with a Group I, II or III organometal compound as an initiator of the polymerization of conjugated dienes having 4 to 6 carbon atoms. Such homopolymers exhibit undesirable cold-flow characteristics. Such procedure is to be distinguished from the present treatment which results in a product having reduced cold flow.

In order to reduce the cold flow, the polymer in solution in an inert solvent, usually a hydrocarbon aliphatic solvent, is treated at a temperature of 40° C. or greater up to the boiling point of the solvent. For each 100 parts of polymer, 0.2 to 10 parts of n-butyllithium and 0.1 to 6 parts of titanium tetrachloride is used. Usually, equimolar parts of n-butyllithium and titanium tetrachloride will be used.

The comonomers with which the conjugated diene may be copolymerized include styrene and its equivalents, such as alpha-methyl styrene, o-, p- and m-methylstyrenes, vinyl naphthalene, etc. These may be made by any procedure which results in a copolymer which has cold-flow characteristics.

The products of the invention may be used wherever rubbers have been used, as in the manufacture of tires, belts, etc. The treated polymers and copolymers have a broader molecular-weight distribution, excellent mill-processability and reduced tendency to cold flow, compared to the polymers and copolymers from which they are formed.

The invention is further described in connection with the following examples:

EXAMPLE 1

Butadiene-1,3 (33 grams) was polymerized in a 50 percent solution in heptane or other aliphatic hydrocarbon solvent with n-butyllithium (0.616 mole) to obtain a homopolymer of about 100,000 molecular weight. The resulting live polymer containing lithium at one end of the chain was then reacted while in solution with varying amounts of titanium tetrachloride. These treatments showed very little increase in Mooney viscosity and the treated polymers still had considerable cold flow.

EXAMPLE 2

Polymer from Example 1 is treated with reagent such as methanol to remove the live lithium. The resulting dead polymer, still in solution in heptane, is treated with additional amounts of butyllithium and of titanium tetrachloride in various ratios. Data showing that n-butyllithium alone has no effect on the Williams recovery value, and the effect of using n-butyllithium with titanium tetrachloride is tabulated below.

TABLE

| Run No. | Mmole BuLi | Mmole TiCl$_4$ | Williams recovery |
|---|---|---|---|
| 1 | 3.08 | None | 0.05 |
| 2 | 3.08 | 0.5 | 1.44 |
| 3 | 3.08 | 3.0 | 1.70 |

The Williams recovery values are given to show that without the joining reaction with the titanium tetrachloride, the Williams recovery is low, which is normally the case with polymers made with butyllithium alone, as catalyst.

From the table, one can see that when both n-butyllithium and titanium tetrachloride are added, joining occurs and the cold flow of the polymer is considerably reduced, as evidenced by Williams recovery values of 1.44 and 1.70 given in the table. It is evident that joining is produced by the combined effect of n-butyllithium and titanium tetrachloride. The Williams recovery value is a measure of the cold-flow properties of a polymer or copolymer, indicating whether it has any cold-flow properties and the lack of such properties.

The cold flow of butadiene-isoprene copolymer is reduced when subjected to the same treatment.

EXAMPLE 3

Copolymer of butadiene-styrene which has been quenched to remove the live lithium is treated as in Example 2, with n-butyllithium and titanium tetrachloride, and considerable reduction in the cold flow of the copolymer results.

EXAMPLE 4

Copolymer of butadiene and alpha-methyl styrene is produced in hexane, using n-butyllithium as catalyst. The cement is quenched to remove the lithium from the copolymer. The resultant copolymer, still in solution, is treated with equal molar ratios of n-butyllithium and titanium tetrachloride, with considerable reduction in the cold flow of the copolymer due to considerable broadening of the molecular weight distribution of the copolymer.

I claim:
1. The process of reducing the cold flow of a rubber polymer which is (a) a homopolymer of a hydrocarbon conjugated diene of 4 to 6 carbon atoms or (b) a co- polymer of two or more such monomers or a copolymer of such a diene with styrene, which polymer exhibits objectionable cold-flow properties, which process comprises treating the same in an organic solvent with 0.2 to 10 parts of a hydrocarbon lithium and 0.1 to 6 parts of titanium tetrachloride per 100 parts of the polymer, until the polymer has wider molecular weight distribution and less cold flow.

2. The process of claim 1 in which polybutadiene is treated.

References Cited

FOREIGN PATENTS 992,210  5/1965  Great Britain.

JOSEPH L. SCHOFER, Primary Examiner
W. F. HAMROCK, Assistant Examiner

U.S. Cl. X.R.
260—82.1, 85.1